(12) United States Patent
Jiang et al.

(10) Patent No.: US 12,439,403 B2
(45) Date of Patent: Oct. 7, 2025

(54) INCREASING TRANSMISSIONS OF SOUNDING REFERENCE SIGNALS IN WIRELESS COMMUNICATION SYSTEMS

(71) Applicant: ZTE Corporation, Guangdong (CN)

(72) Inventors: Chuangxin Jiang, Guangdong (CN); Zhaohua Lu, Guangdong (CN); Hao Wu, Guangdong (CN); Shujuan Zhang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 305 days.

(21) Appl. No.: 17/856,622

(22) Filed: Jul. 1, 2022

(65) Prior Publication Data

US 2022/0338220 A1    Oct. 20, 2022

Related U.S. Application Data

(63) Continuation of application No. PCT/CN2020/070239, filed on Jan. 3, 2020.

(51) Int. Cl.
*H04W 72/1268* (2023.01)
*H04L 1/08* (2006.01)
(Continued)

(52) U.S. Cl.
CPC ........... *H04W 72/1268* (2013.01); *H04L 1/08* (2013.01); *H04L 5/0051* (2013.01); *H04W 80/02* (2013.01)

(58) Field of Classification Search
CPC .... H04W 72/1268; H04W 80/02; H04L 1/08; H04L 5/0051; H04L 5/0016; H04L 5/0053; H04L 5/0094; H04L 5/0048
See application file for complete search history.

(56) References Cited

U.S. PATENT DOCUMENTS

| 10,367,620 B2 | 7/2019 | Iyer et al. |
| 11,323,295 B2 | 5/2022 | Choi et al. |

(Continued)

FOREIGN PATENT DOCUMENTS

| CN | 102195703 A | 9/2011 |
| CN | 102647789 A | 8/2012 |

(Continued)

OTHER PUBLICATIONS

International Search Report and Written Opinion for International Application No. PCT/CN2020/070239, mailed on Jun. 30, 2020 (7 pages).

(Continued)

*Primary Examiner* — Asad M Nawaz
*Assistant Examiner* — Najeeb Ansari
(74) *Attorney, Agent, or Firm* — Perkins Coie LLP (57) ABSTRACT

Methods, systems, and devices for increasing transmission capacity of sounding reference signals (SRS) in mobile communication technology are described. An example method for wireless communication includes receiving, by a wireless device from a network node, a configuration comprising A orthogonal code sequences for a sounding reference signal (SRS) resource, wherein each of the A orthogonal code sequences is configured for L adjacent SRS symbols within the SRS resource, wherein L is a length of each of the A orthogonal code sequences, and wherein L and A are positive integers, and transmitting a reference signal that is generated based on the configuration.

12 Claims, 9 Drawing Sheets

(51) Int. Cl.
*H04L 5/00* (2006.01)
*H04W 80/02* (2009.01)

(56) References Cited

U.S. PATENT DOCUMENTS

| | | | |
|---|---|---|---|
| 2012/0014349 A1 | 1/2012 | Chung et al. | |
| 2015/0065153 A1 | 3/2015 | Nissila et al. | |
| 2015/0327244 A1 | 11/2015 | Pajukoski et al. | |
| 2017/0048717 A1 | 2/2017 | Yoo et al. | |
| 2018/0137199 A1 | 5/2018 | Miller et al. | |
| 2019/0372734 A1 | 12/2019 | Choi et al. | |
| 2021/0328739 A1* | 10/2021 | Davydov | H04W 72/0446 |
| 2022/0231812 A1* | 7/2022 | Go | H04W 72/23 |
| 2023/0018270 A1* | 1/2023 | Okamura | H04L 27/2634 |

FOREIGN PATENT DOCUMENTS

| | | |
|---|---|---|
| CN | 104350690 A | 2/2015 |
| CN | 109565370 A | 4/2019 |
| CN | 110366837 A | 10/2019 |
| KR | 20190090869 A | 8/2019 |

OTHER PUBLICATIONS

European Search Report for EP Patent Application No. 20887357.0, dated Oct. 17, 2022, 8 pages.
CMCC, "Discussion on SRS capacity improvement," 3GPP TSG RAN WG1 Meeting #82, R1-154303, Beijing, China, Aug. 24-28, 2015, 3 pages.
Qualcomm Incorporated, "Additional SRS symbols," 3GPP TSG-RAN WG1 #97, R1-1907006, Reno, USA, May 13-17, 2019, 10 pages.
Korean notice of allowance issued in KR Patent Application No. 10-2022-7026370, dated Jan. 3, 2025, 8 pages, English translation included.
Ericsson, "On SRS Design," 3GPP TSG-RAN WG1 #90, R1-1714316, Prague, Czechia, Aug. 21-25, 2017, 22 pages.
Ericsson, "SRS Design," 3GPP TSG-RAN WG1 #89, R1-1708709, Hangzhou, China, May 15-19, 2017, 10 pages.
Chinese office action issued in CN Patent Application No. 202080086439.4, dated Oct. 24, 2024, 18 pages. English translation included.
Intel Corporation, "Enhancements to SRS Configurations for UL CoMP," 3GPP TSG-RAN WG1 Meeting #70, R1-123178, Qingdao, China, Aug. 13-17, 2012, 6 pages.
European Communication under Rule 71(3) EPC issued in EP Patent Application No. 20887357.0, dated Oct. 7, 2024, 37 pages.
Dahlman et al., "5G NR: The Next Generation Wireless Access Technology," Academic Press, Elsevier Ltd., London, 2018, ISBN 978-0-12-814323-0, p. 150.
3GPP TR 25.836, V4.0.0, (Dec. 2000), Technical Report, 3rd Generation Partnership Project; Technical Specification Group Radio Access Network; NodeB Synchronisation for TDD; (Release 4), 19 pages.
3GPP TR 38.912, V14.1.0, (Jun. 2017), Technical Specification, 3rd Generation Partnership Project; Technical Specification Group Radio Access Network; Study on New Radio (NR) access technology, (Release 14), 74 pages.
Chinese Notice of Grant of Invention Patent Right issued in CN Patent Application No. 202080086439.4, dated Apr. 1, 2025, 4 pages. English translation included.

* cited by examiner

Symbol 10 11 12 13

| b0 | b1 | b2 | b3 | b4 | b5 | b6 | b7 |
|----|----|----|----|----|----|----|----|
| c0 | c1 | c2 | c3 | c4 | c5 | c6 | c7 |

| a0 | a1 | a2 | a3 | a4 | a5 | a6 | a7 |
|----|----|----|----|----|----|----|----|
| a0 | a1 | a2 | a3 | a4 | a5 | a6 | a7 |

Symbol 10 11 12 13

INCREASING TRANSMISSIONS OF SOUNDING REFERENCE SIGNALS IN WIRELESS COMMUNICATION SYSTEMS

CROSS-REFERENCE TO RELATED APPLICATIONS

This application is a continuation of International Patent Application No. PCT/CN2020/070239, filed on Jan. 3, 2020, the contents of which are incorporated herein by reference in their entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques will provide support for an increased number of users and devices, as well as support for higher data rates.

SUMMARY

This document relates to methods, systems, and devices for increasing transmission capacity of sounding reference signals (SRS) in mobile communication technology, including 5th Generation (5G) and New Radio (NR) communication systems.

In one exemplary aspect, a wireless communication method is disclosed. The method includes transmitting, by a network node, a configuration comprising A orthogonal code sequences for a sounding reference signal (SRS) resource, wherein each of the A orthogonal code sequences is configured for L adjacent SRS symbols within the SRS resource, wherein L is a length of each of the A orthogonal code sequences, and wherein L and A are positive integers.

In another exemplary aspect, a wireless communication method is disclosed. The method includes receiving, by a wireless device from a network node, a configuration comprising A orthogonal code sequences for a sounding reference signal (SRS) resource, wherein each of the A orthogonal code sequences is configured for L adjacent SRS symbols within the SRS resource, wherein L is a length of each of the A orthogonal code sequences, and wherein L and A are positive integers; and transmitting a reference signal that is generated based on the configuration.

In yet another exemplary aspect, a wireless communication method is disclosed. The method includes repeatedly transmitting, by a wireless device to a network node, a plurality of sounding reference signal (SRS) symbols at C time locations, wherein C is a positive integer, and wherein information associated with the C time locations is configured for each SRS resource, SRS resource set or SRS trigger state.

In yet another exemplary aspect, a wireless communication method is disclosed. The method includes receiving, by a network node from a wireless device, repeated transmissions of a plurality of sounding reference signal (SRS) symbols at C time locations, wherein C is a positive integer, and wherein information associated with the C time locations is configured for each SRS resource, SRS resource set or SRS trigger state.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

In NR communication systems, there are at least two types of uplink reference signals that provide information about channel quality, e.g., a demodulation reference signal (DMRS) and a sounding reference signal (SRS). With the help of the reference signals, a network node (e.g., base station or gNB) can make optimal decisions regarding resource allocation for uplink transmissions, link adaptation and to decode transmitted data from the wireless device (e.g., UE).

The SRS is an uplink reference signal which is transmitted by the wireless device to the network node, and gives information about the combined effect of multipath fading, scattering, Doppler and power loss of transmitted signal. The network node is able to estimate the channel quality using this reference signal and manages further resource scheduling, beam management and power control of signal. Thus, the SRS provides information to network node about the channel over the entire bandwidth of interest and using this information, the network node can make decisions regarding resource allocation based on improved channel estimates compared to other portions of the bandwidth.

Figure 1:
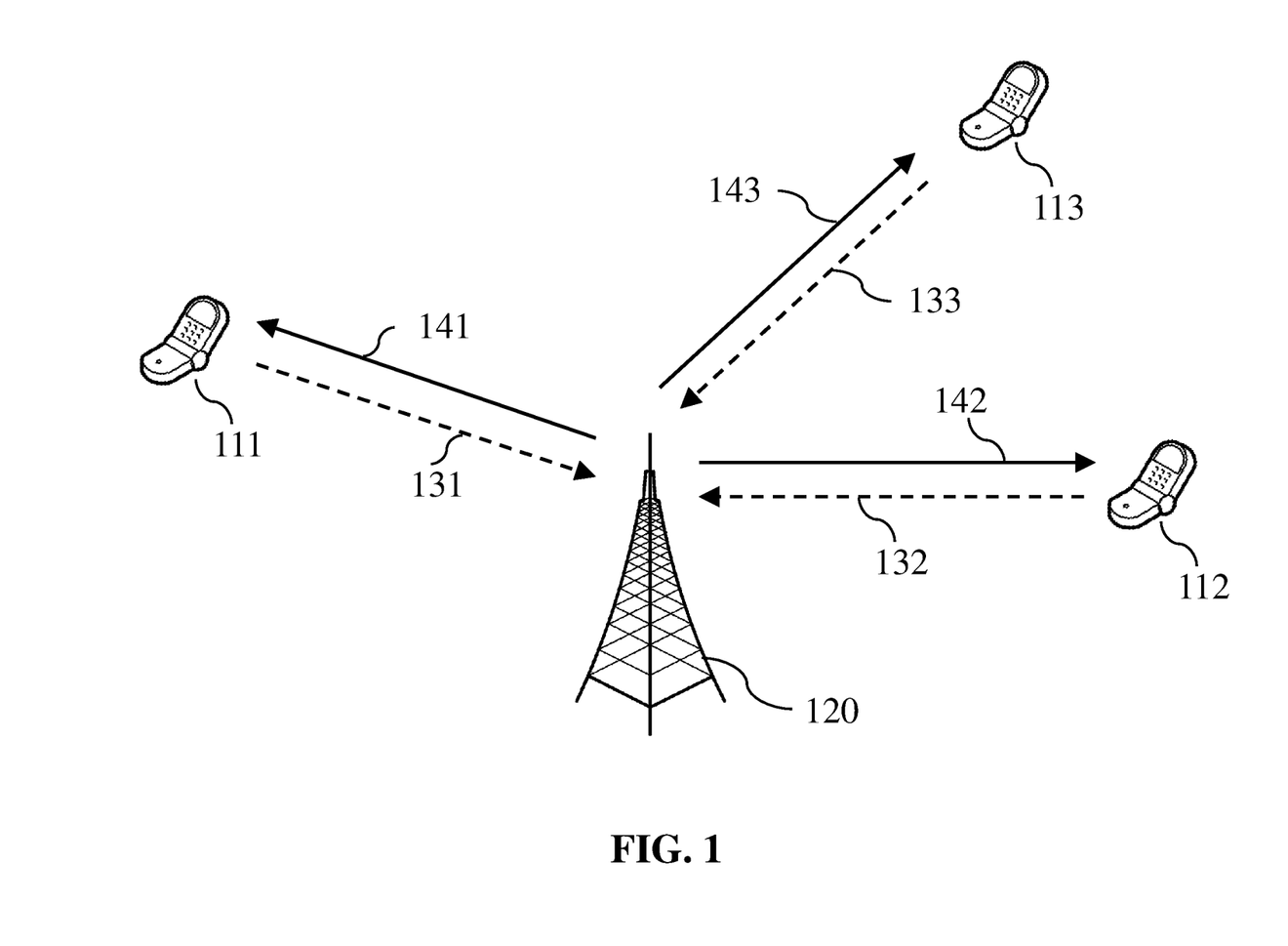
FIG. 1 shows an example of a base station (BS) and user equipment (UE) in wireless communication, in accordance with some embodiments of the presently disclosed technology.

FIG. 1 shows an example of a wireless communication system (e.g., an LTE, 5G or New Radio (NR) cellular network) that includes a BS 120 and one or more user equipment (UE) 111, 112 and 113. In some embodiments, the downlink transmissions (141, 142, 143) include a configuration for the SRS. In response, the UEs transmit (131, 132, 133) the SRS to the BS 120. The UE may be, for example, a smartphone, a tablet, a mobile computer, a machine to machine (M2M) device, a terminal, a mobile device, an Internet of Things (IoT) device, and so on.

The present document uses examples from the 3GPP New Radio (NR) network architecture and 5G protocol only to facilitate understanding and the disclosed techniques and embodiments may be practiced in other wireless systems that use different communication protocols than the 3GPP protocols.

In existing implementations, uplink SRS in NR supports inter-symbol repetition. Each SRS resource can be configured with N≤4 SRS time-domain OFDM symbols. The inter-symbol repetition factor R≤N, which means that every R adjacent OFDM symbols are transmitted repeatedly over the same time-frequency domain resources. As shown in the example in FIG. 2, an SRS resource is configured with N=4 symbols and with a repetition factor, R=2. However, since the SRS in NR can only be transmitted on the last 6 symbols in a slot, this capacity may not be sufficient for the increasing demand for capacity and connectivity. Embodiments of the disclosed technology include systems and methods to expand the capacity of SRS.

Section headings are used in the present document for ease of understanding and do not limit the embodiments and techniques to the corresponding sections. As such, embodiments from one section can be combined with embodiments from other sections.

Example Embodiments to Increase SRS Capacity Using TD-OCC Sequences

In some embodiments, and in order to increase the capacity of the SRS, the number of SRS symbols available in a slot can be expanded from 6 to 14, so that any symbol can be a potential position for the SRS resource.

In some embodiments, orthogonal code sequences can be introduced among adjacent SRS symbols. In an example, orthogonal code sequences generally refer to time-domain orthogonal cover code (TD-OCC) orthogonal sequences, which are also referred to as orthogonal masks. This terminology extended to other orthogonal sequences, e.g., Discrete Fourier Transform (DFT) orthogonal sequences.

In an example, and as shown in Table 1, orthogonal sequences of length L=2 are denoted P0 and P1. In another example, orthogonal sequences of length L=4 are G0, G1, G2, and G3, and are shown in Table 2. In yet another example, orthogonal sequences of length L=8 are Q0, Q1, Q2, Q3, Q4, Q5, Q6, Q7, and are shown in Table 3. The length L of each orthogonal sequence refers to the number of values contained in the orthogonal sequence.

TABLE 1

| Length-2 TD-OCC sequences | |
| --- | --- |
| P0 | P1 |
| 1 | 1 |
| 1 | −1 |

TABLE 2

| Length-4 TD-OCC sequences | | | |
| --- | --- | --- | --- |
| G0 | G1 | G2 | G3 |
| 1 | 1 | 1 | 1 |
| 1 | 1 | −1 | −1 |
| 1 | −1 | 1 | −1 |
| 1 | −1 | −1 | 1 |

TABLE 3

| Length-8 TD-OCC sequences | | | | | | | |
| --- | --- | --- | --- | --- | --- | --- | --- |
| Q0 | Q1 | Q2 | Q3 | Q4 | Q5 | Q6 | Q7 |
| 1 | 1 | 1 | 1 | 1 | 1 | 1 | 1 |
| 1 | 1 | 1 | 1 | −1 | −1 | −1 | −1 |
| 1 | 1 | −1 | −1 | 1 | 1 | −1 | −1 |
| 1 | 1 | −1 | −1 | −1 | −1 | 1 | 1 |
| 1 | −1 | 1 | −1 | 1 | −1 | 1 | −1 |
| 1 | −1 | 1 | −1 | −1 | 1 | −1 | 1 |
| 1 | −1 | −1 | 1 | 1 | −1 | −1 | 1 |
| 1 | −1 | −1 | 1 | −1 | 1 | 1 | −1 |

In some embodiments, and in order to achieve maximum flexibility, a network node (e.g., a base station or gNB) can configure A time-domain orthogonal code sequences for each SRS resource or SRS resource set through high-level signaling, wherein A≥1. In an example, the high-level signaling may include Radio Resource Control (RRC) signaling or Medium Access Control (MAC) Control Element (CE) signaling.

In some embodiments, A=N/R, where N is the number of OFDM symbols contained in the SRS resource and R is the repetition factor (e.g., as shown in FIG. 1, N=4 and R=2). If N/R is not an integer, A=⌊N/R⌋ or A=⌈N/R⌉, where ⌊x⌋ and ⌈x⌉ represent the application of the floor( ) and ceiling( ) functions to the argument x, respectively.

In some embodiments, A=N/L, where N is the number of OFDM symbols contained in the SRS resource and L is the length of orthogonal code sequence. If N/L is not an integer, A=⌊N/L⌋ or A=⌈N/L⌉.

In some embodiments, A=R/L, where N is the number of OFDM symbols contained in the SRS resource and L is the length of orthogonal code sequence. If R/L is not an integer, A=⌊R/L⌋ or A=⌈R/L⌉.

Figure 2:
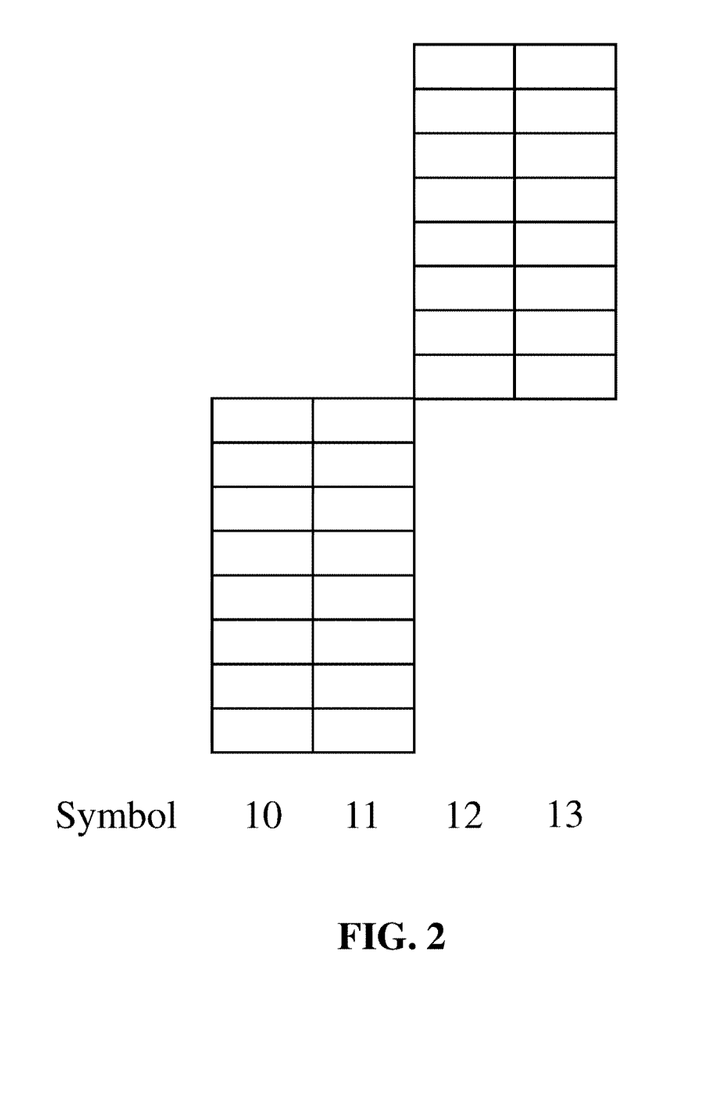
FIG. 2 shows an example of a 5G NR sounding reference signal (SRS) with repetition and frequency hopping.

In an example, if the number of symbols configured by the base station for SRS resource 0 through high-level signaling is N=4 and the repetition factor R=2, then the base station configures A=4/2=2 orthogonal code sequences using high-level signaling. They are used for every consecutive R time-domain symbols in the SRS resource. For example, and as shown in FIG. 2, the base station configures the TD-OCC codes [1 −1] and [1 1]; the code [1 −1] is used for symbols {10, 11}, and the orthogonal code [1 1] is used for symbols {12, 13}. In other words, the time-domain symbols of the SRS resource in a slot are divided into A time-domain symbol groups, each time-domain symbol group contains R consecutive symbols, and the configured A time-domain orthogonal code sequences are used for the respective A time-domain symbol groups.

In another example, A=N/L, and if the number of symbols configured by the base station for SRS resource 0 through high-level signaling is N=4 and L=2, then the base station configures A=4/2=2 orthogonal code sequences using high-level signaling. They are used for every consecutive L time-domain symbols in the SRS resource. The time-domain symbols of the SRS resource in a slot are divided into A time-domain symbol groups, each time-domain symbol group contains L consecutive symbols, and the configured A time-domain orthogonal code sequences are used for the respective A time-domain symbol groups.

In another example, A=R/L, and if the number of symbols configured by the base station for SRS resource 0 through high-level signaling is N=R=4 and L=2, then the base station configures A=4/2=2 orthogonal code sequences using high-level signaling. They are used for every consecutive L time-domain symbols in the SRS resource. Each R adjacent SRS symbols of the SRS resource are divided into A time-domain symbol groups, each time-domain symbol group contains L consecutive symbols, and the configured A time-domain orthogonal code sequences are used for the respective A time-domain symbol groups.

In some embodiments, if SRS frequency hopping is enabled, the SRS on each time-domain symbol group may be mapped on a different frequency-domain subband. That is, in a slot, the time-domain orthogonal codes on each SRS frequency hop may be independently configured.

Example Embodiments Using Time-Varying TD-OCC Sequences

In some embodiments, and in order to obtain interference randomization, the time-domain orthogonal code sequence of the SRS resource during transmission may be configured to be time-varying, i.e., changing as a function of time. The time-varying functionality or characteristics may be based on a predefined rule or a rule configured by Radio Resource Control (RRC) signaling.

In an example, if an SRS resource is transmitted on slot n, then the orthogonal code sequence index may be defined as s(n)=mod (n, L), where L refers to the length of the time-domain orthogonal code sequence. Typically, L=R but this may not necessarily always be the case. In another example, and with reference to Table 3, a TD-OCC sequence of length 8 uses the OCC sequence Q0 on slot 0 and the OCC sequence Q2 on slot 2. In this example, the time-domain orthogonal code sequence used by SRS is related to the slot index.

In some embodiments, the time-domain orthogonal code sequence used by SRS may be related to the time-domain symbol index.

In some embodiments, multiple time-domain OFDM symbols are divided into several groups, and the time-domain orthogonal code sequence used by the SRS is related to the time-domain symbol group index. Each time-domain symbol group may include R or L consecutive OFDM time-domain symbols.

In some embodiments, the time-domain orthogonal code sequence used by the SRS may be related to the number of times the SRS is transmitted. For example, when the SRS cycle is 10 slots, and the SRS is transmitted on slots 0, 10, 20, 30, 40, . . . (corresponding to the transmission time index 0, 1, 2, 3, 4, . . . ), then the time used by the time-domain orthogonal code sequence is related to the number of SRS transmissions. For example, the TD-OCC length is 4, and with reference to Table 2, the TD-OCC codes used on slots 0, 10, 20, 30, 40, . . . are G0, G1, G2, G3, G0, . . .

As described in the above embodiments, the time-domain orthogonal code sequence of the SRS resource during transmission is related to one or more of the slot index, the symbol or symbol group index, and/or the serial number (or index) of the transmission.

Example Embodiments using Repeated Basic Sequences

In some existing implementations (e.g., NR Rel-15), the SRS sequence changes with the time-domain OFDM symbol. In order for a new user UE 0 to use a time-domain orthogonal code sequence to multiplex with an existing user UE 1, the TD-OCC code sequence of the new users needs to be the same as that of UE 1. Additionally, the sequence of UE 0 also needs to change as the symbol changes, and it needs to have the same frequency-domain start position as UE 1, and the bandwidth and sequence length also need to be the same.

If the start positioning or bandwidth of the SRS in the frequency-domain is different, the SRS basic sequences of UE 0 (before using the TD-OCC) and UE 1 (without the application of the TD-OCC) will be different, and the TD-OCC cannot be used to multiplex UE 0 and UE 1.

However, two new users such as UE 2 and UE 3 can be multiplexed, even if their SRS frequency-domain starting positions or bandwidths are different. Even if the basic sequences are different, as long as UE 2 and UE 3 include an overlapping symbol and the sequences do not change with time, then they can still be used to perform time-domain code division multiplexing.

Figure 3A:
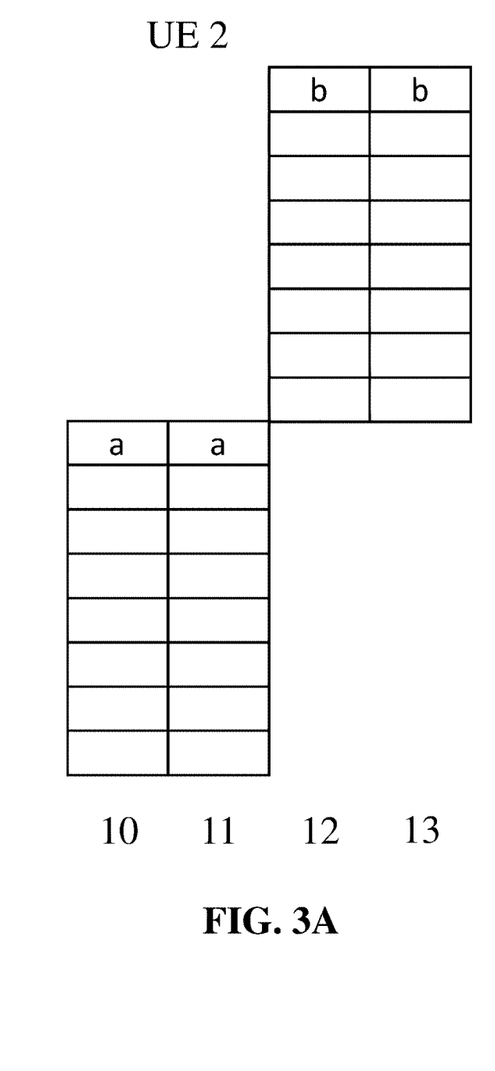
FIGS. 3A and 3B show examples of assigning different orthogonal code sequences to a first new user and a second new user, respectively.
Figure 3B:
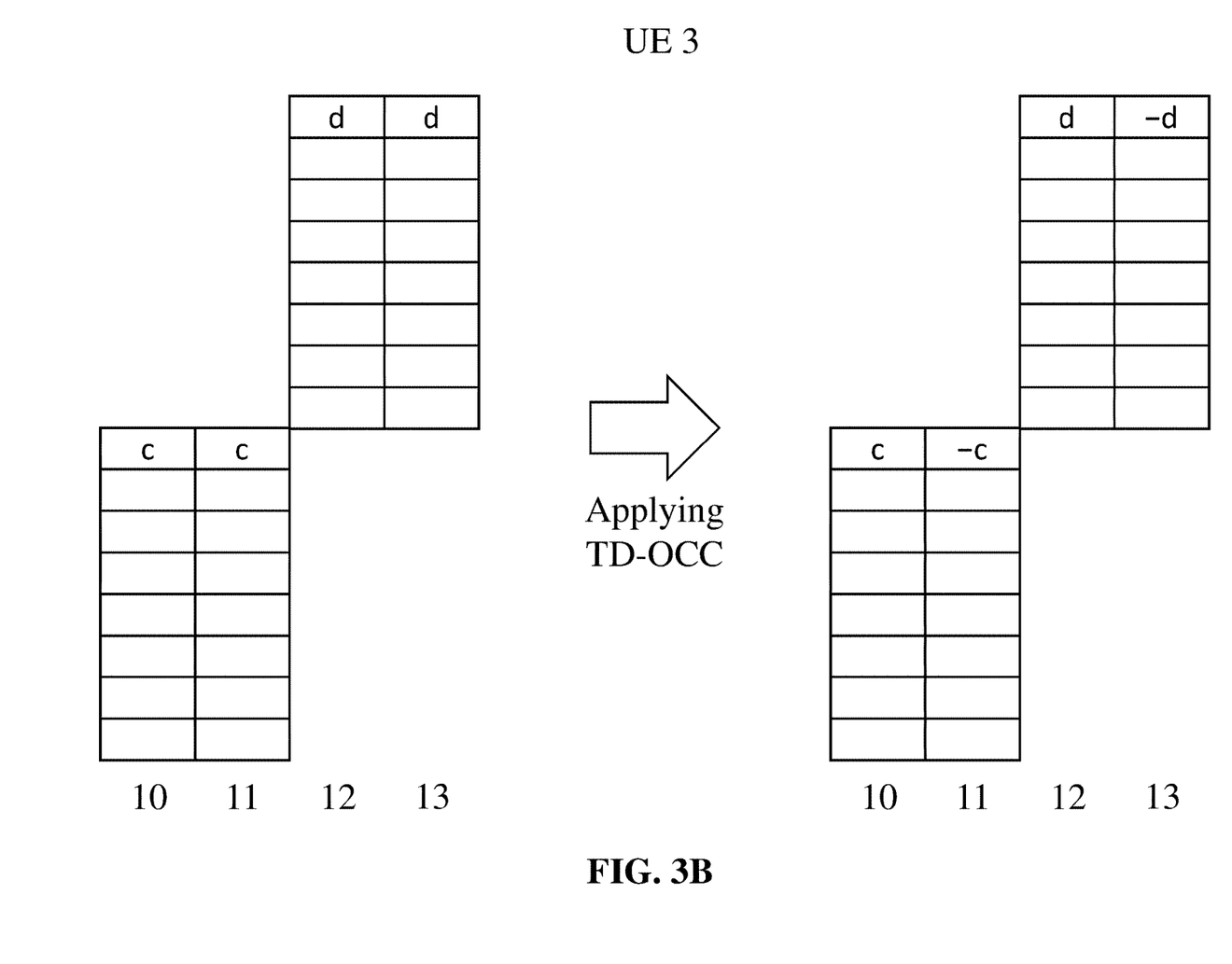

Thus, in order to support users of different TD-OCC codes, the base station can configure a user through high-level signaling to determine whether the basic sequence of the R' SRS time-domain symbols is repeated. As shown in FIGS. 3A and 3B for UE 2 and UE 3, respectively, the RRC signaling can be configured in R'=2 symbols, and the SRS time-domain sequence remains unchanged. That is, the SRS time-domain sequence on each R' SRS time-domain symbol is the same as the sequence of the first of the R' symbols. As shown in FIGS. 3A and 3B, the basic sequence on symbols {10, 11} (before using TD-OCC as shown on the left-hand side of FIG. 3B) is the same. If the RRC signaling is used to configure the R' symbols and the SRS time-domain sequence is changed, then the resulting effect is the same as in existing implementations. Typically R'≤R, e.g. R'=R, or R'=L, or R'=N but this is not necessarily always the case.

In some embodiments, the base station can configure a user with high-level signaling to inform the UE whether the basic sequence has a repetitive relationship. That is, an SRS resource includes B symbol groups, and each symbol group includes R' consecutive OFDM symbols, where B≥1. The high-level signaling is used for B symbol groups, and indicates whether the basic sequence of the R' SRS symbols in each symbol group (the sequence before the time-domain orthogonal code is used) is the same. Even if it is a resource, on multiple SRS symbol groups in a slot, the indications used to inform repetitive relationship in different groups can be different. Typically, B=N/R' or B=R/R'.

Figure 4:
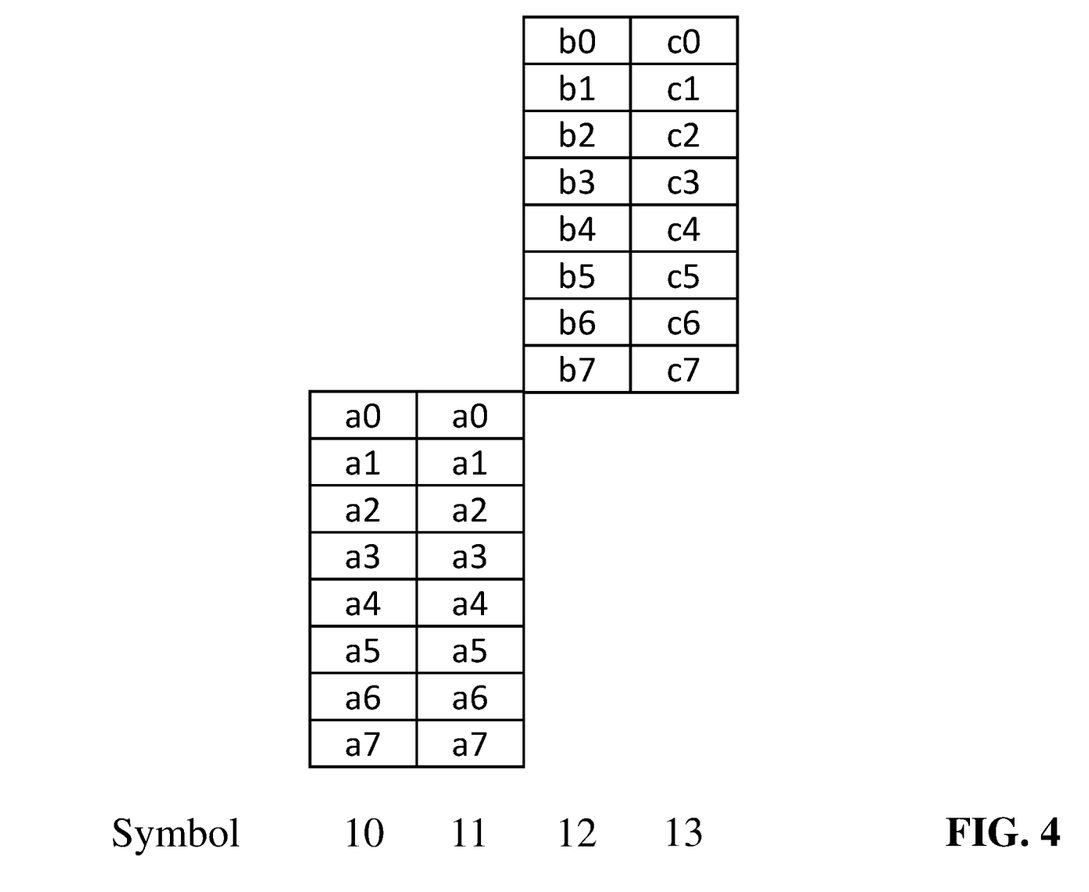
FIG. 4 shows an example of repeating a basic SRS sequence on multiple SRS groups.

As shown in FIG. 4, where N=4, R'=R=2 and B=N/R'=2, the base station can use 2-bits of RRC signaling to indicate that the basic sequences on symbols 10 and 11 are the same, whereas the basic sequences on symbols 12 and 13 are not duplicated.

In some embodiments, and in conjunction with the previously described embodiments, the relationship between the application of the time-domain orthogonal sequence code and whether the basic sequence is repeated or not can be established. This approach advantageously saves signaling overhead.

In some embodiments, if the time-domain orthogonal sequence changes with the change of the slot index, or the symbol or symbol group index, or the sequence number (or index) of a transmission, the basic sequence may be repeated within the R' symbols. In other embodiments, if the time-domain orthogonal sequence does not change with the change of the slot index, or the symbol or symbol group index, or the sequence number of the transmission, the basic sequence is not repeated.

Example Embodiments for using TD-OCC Sequences to Resolve Collisions

In existing implementations, when the SRS and physical uplink control channel (PUCCH) signals collide, the SRS on the overlapping symbol will be dropped if the priority of the SRS is low. The UE will not transmit the SRS on time-domain symbols that are overlapping with the PUCCH (or other high priority signals). It is noted that the SRS is still transmitted in the non-overlapping symbols.

In some embodiments, the time-domain orthogonal code sequences that are applied to SRS resources may be used to distinguish SRS resources of different users that may be mapped to the same time-frequency domain resources.

Figure 5:
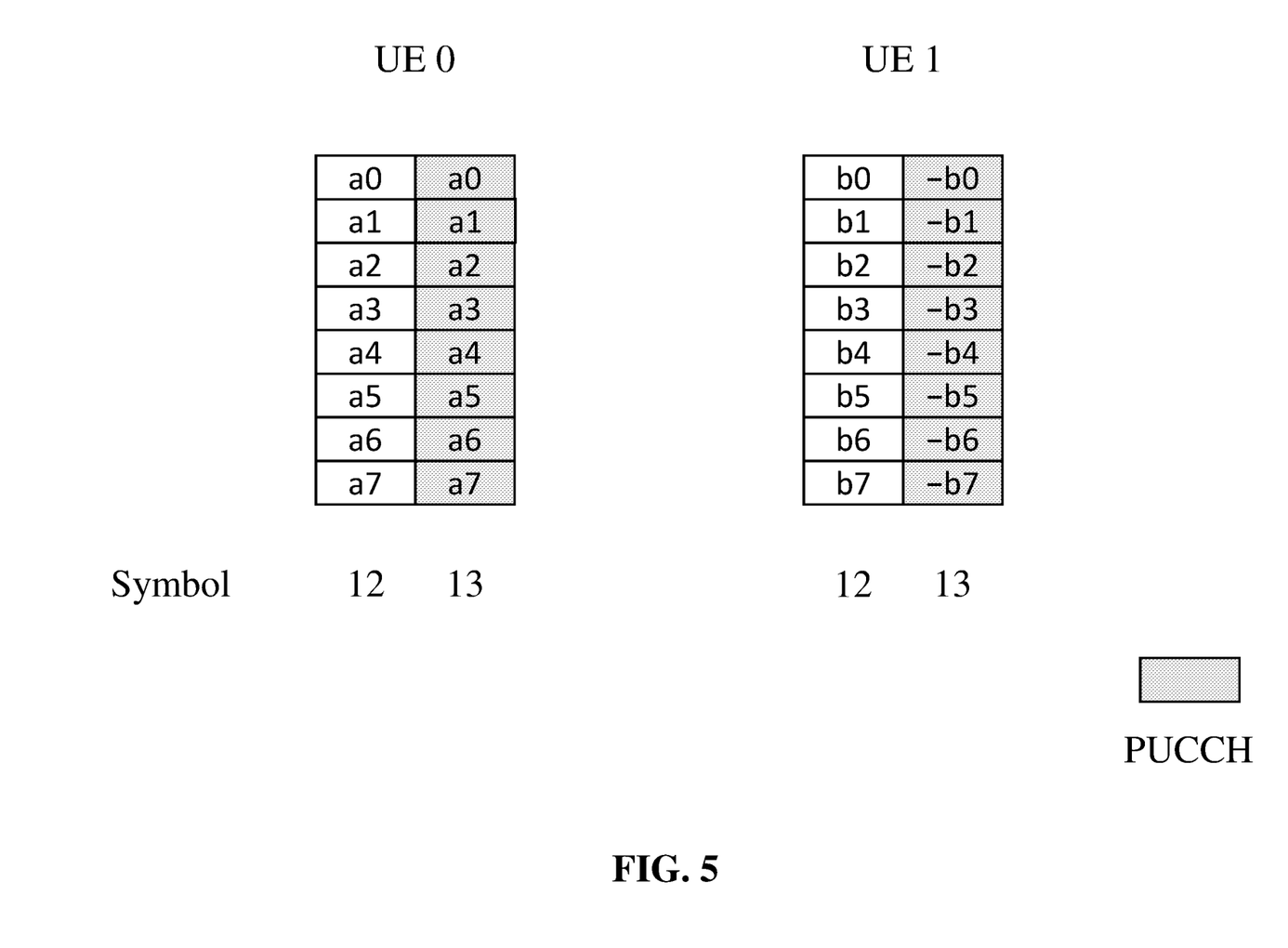
FIG. 5 shows an example of multiplexing SRS signals and physical uplink control channel (PUCCH) signals on the same time-frequency domain resources.

As shown in FIG. 5, UE 0 and UE 1 are multiplexed on the same time-frequency domain resources. UE 0 uses the TD-OCC code [1 1] and UE 1 uses the TD-OCC code [1 −1]. In the case when the PUCCH of UE 0 and UE 1 are transmitted on symbol 13, the SRS from both UE 0 and UE 1 on symbol 13 should be dropped, but the SRS on symbol 12 should be still be transmitted. However, because both UE 0 and UE 1 transmit the SRS on symbol 12, orthogonality from TD-OCC multiplexing is no longer maintained, and the base station cannot correctly detect SRS from either UE 0 or UE 1. In effect, the SRS may cause serious interference between UE 0 and UE 1.

In some embodiments, determining which SRS to drop is based on the applied or configured time-domain orthogonal code. The actual dropped number of SRS or the dropped SRS location are associated with the applied or configured time-domain orthogonal code.

In an example, consider the case when the length of the configured time-domain orthogonal code is 2.
  If the configured TD-OCC code=[1 −1], the SRS unit that is dropped is Y1=2 symbols. That is, both Y1 adjacent SRS symbols that applied TD-OCC [1 −1] should be dropped even if only one of the two SRS symbols collide with PUCCH. As shown in FIG. 5, UE 1 will not transmit the SRS on both symbols 12 and 13.
  If the configured TD-OCC code=[1 1], the SRS unit that is dropped is Y2=1 symbols. That is, the dropped SRS symbols are equal to the SRS symbols which actually collide with PUCCH. This behavior mirror that in existing implementations (e.g., NR Rel-15) wherein the dropped unit is one symbol. In the case that both symbols 12 and 13 collide with PUCCH, both SRS symbols should be dropped.
  In the case that the time-domain orthogonal code is not configured, the dropped SRS symbols are equal to the SRS symbols which actually collide with PUCCH, which mirrors the behavior in existing implementations (e.g., NR Rel-15).

Based on the above rules, as shown in the example in FIG. 5, only SRS symbol 12 from UE 0 will be transmitted. UE 1 will not transmit SRS on symbol 12 because of the configured TD-OCC [1 −1].

In some embodiments, other equivalent time-domain orthogonal codes may be used. For example, instead of using [1 1] and [1 −1], other time-domain orthogonal codes such as [1 j] and [1 −j], respectively, may be used. The SRS unit that is dropped refers to the minimum granularity of the number of dropped SRS symbols.

In another example, consider the case when the length of the configured time-domain orthogonal code is 4.
  If the configured TD-OCC code is [1 1 −1 −1] or [1 −1 −1 1], the SRS unit that is dropped is X1=4 symbols. That is, both X1 adjacent SRS symbols configured with TD-OCC [1 1 −1 −1] or [1 −1 −1 1] should be dropped even if only one SRS symbols collides with PUCCH. In another example, X1=2.
  If the configured TD-OCC code is [1 −1 1 −1], the SRS unit that is dropped is X2=2 symbols. That is, both X2 adjacent SRS symbols configured with TD-OCC [1 −1 1 −1] should be dropped even if only one SRS symbols collides with PUCCH.
  If the configured TD-OCC code is [1 1 1 1], the SRS drop unit is X3=1 symbol. That is, the dropped SRS symbols are equal to the SRS symbols which actually collide with PUCCH. This behavior mirrors existing implementations (e.g., NR Rel-15), which the dropped unit is one symbol.
  In the case when time-domain orthogonal code is not configured, the dropped SRS symbols are equal to the SRS symbols which actually collide with PUCCH, which mirror the behavior in existing implementations (e.g., NR Rel-15).

In other embodiments, determining which SRS symbols to drop is based on a higher layer configuration. That is, the SRS drop unit is configured by one or more higher layer parameters.

In yet other embodiments, determining which SRS symbols to drop may be predefined. For example, it may be predefined that the SRS drop unit is 1 if TD-OCC code is [1 1 1 1] or [1 1], and higher layer signaling is used to configure the value of SRS drop unit if another TD-OCC code is used.

Example Embodiments for Increasing SRS Coverage

In addition to SRS capacity issues, SRS coverage issues are also important to ensure meeting the increasing demands of capacity and connectivity. Especially for cell edge users, power is relatively limited, so coverage is relatively limited. Current implementations (e.g., NR Rel-15) support up to 4 consecutive SRS time-domain symbol repetitions, which may not be enough for some users.

In some embodiments, and in order to further support SRS repetition, additional high-level signaling parameters are configured for one or more of the following parameters: an SRS resource, an SRS resource set, or an SRS trigger state. The additional high-level signaling parameters may include one or more of the following: SRS resource repetitions, T>1, and time offsets, C>1.

In some embodiments, the base station configures an inter-slot repetition factor T for each aperiodic SRS resource or SRS resource set or SRS trigger state. If the SRS resource or resource set is triggered by the base station, the UE needs to repeatedly transmit the SRS on consecutive T slots or consecutive T uplink slots or consecutive T available uplink slots. Available uplink slots refer to the slots that can transmit all symbols of the SRS resource or resource set.

In some embodiments, the base station configures C time offsets for each SRS resource or SRS resource set or SRS trigger state. In an example, the time offset refers to the symbol offset or slot offset. If the SRS resource or resource set is triggered by the base station, the UE needs to repeatedly transmit the SRS C times at time locations corresponding to the C time offsets.

In an example, the number of SRS resource symbols assigned to a UE by the base station is N=4, the original symbol repetition factor R=2, C=2 with the time offsets being 3 slots and 5 slots. Assuming that the PDCCH triggering aperiodic SRS is sent on slot n, then the UE will send the SRS on slots (n+3) and (n+5). In addition, the frequency-domain resources used by SRS on slot (n+5), the hopping pattern, the spatial relation or quasi-colocation (QCL) assume that the precoding used in this slot is the same as in slot (n+3).

In another example, the number of SRS resource symbols assigned to a UE by the base station is N=4, the original symbol repetition factor R=2, C=2 with the time offsets being 3 slots and 5 slots. Assuming that the PDCCH triggering aperiodic SRS is sent on slot n, then the UE will send the SRS on the third and fifth available slots after slot n.

In yet another example, when C time offsets are configured for a periodic or semi-persistent SRS resource or resource set, the UE repeatedly transmits the SRS in C time locations based on C time offsets within one period. Herein, all values of C time offsets are smaller than the periodicity.

In yet another example, C time offsets are configured for other signals, e.g., physical uplink control channel (PUCCH) and physical downlink control channel (PDCCH). In order to minimize collisions in high-frequency bands, independent beams are configured for C repeated PUCCH, PDCCH or SRS transmissions, where each beam corresponds to a quasi-colocation (QCL), TCI (transmission configuration indicator) or a spatial relation configuration.

Figure 6:
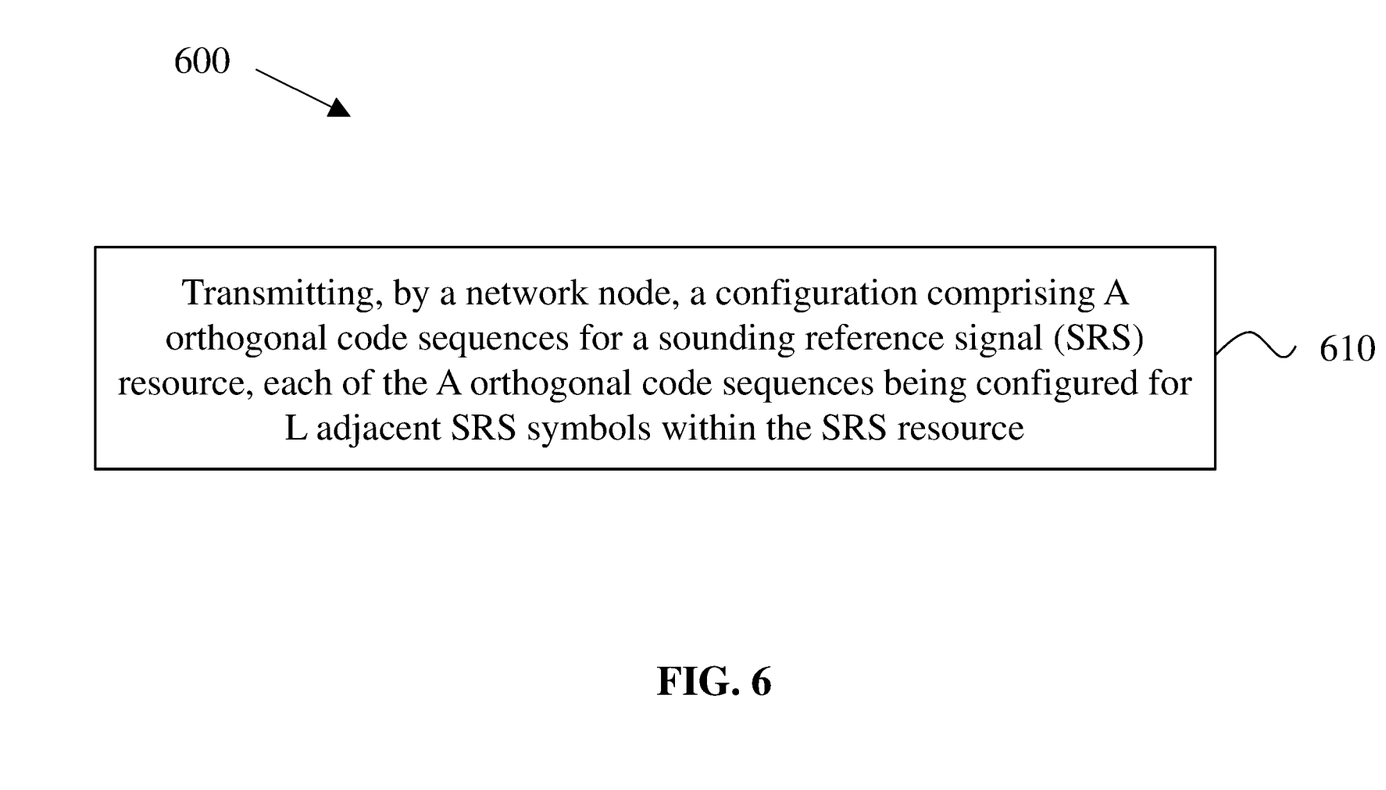
FIG. 6 shows an example of a wireless communication method, in accordance with some embodiments of the presently disclosed technology.

FIG. 6 shows an example of a method 600 for wireless communication. The method 600 includes, at operation 610, transmitting, by a network node, a configuration comprising A orthogonal code sequences for a sounding reference signal (SRS) resource, each of the A orthogonal code sequences being configured for L adjacent SRS symbols within the SRS resource. In some embodiments, L is a length of each of the A orthogonal code sequences, and L and A are positive integers.

Figure 7:
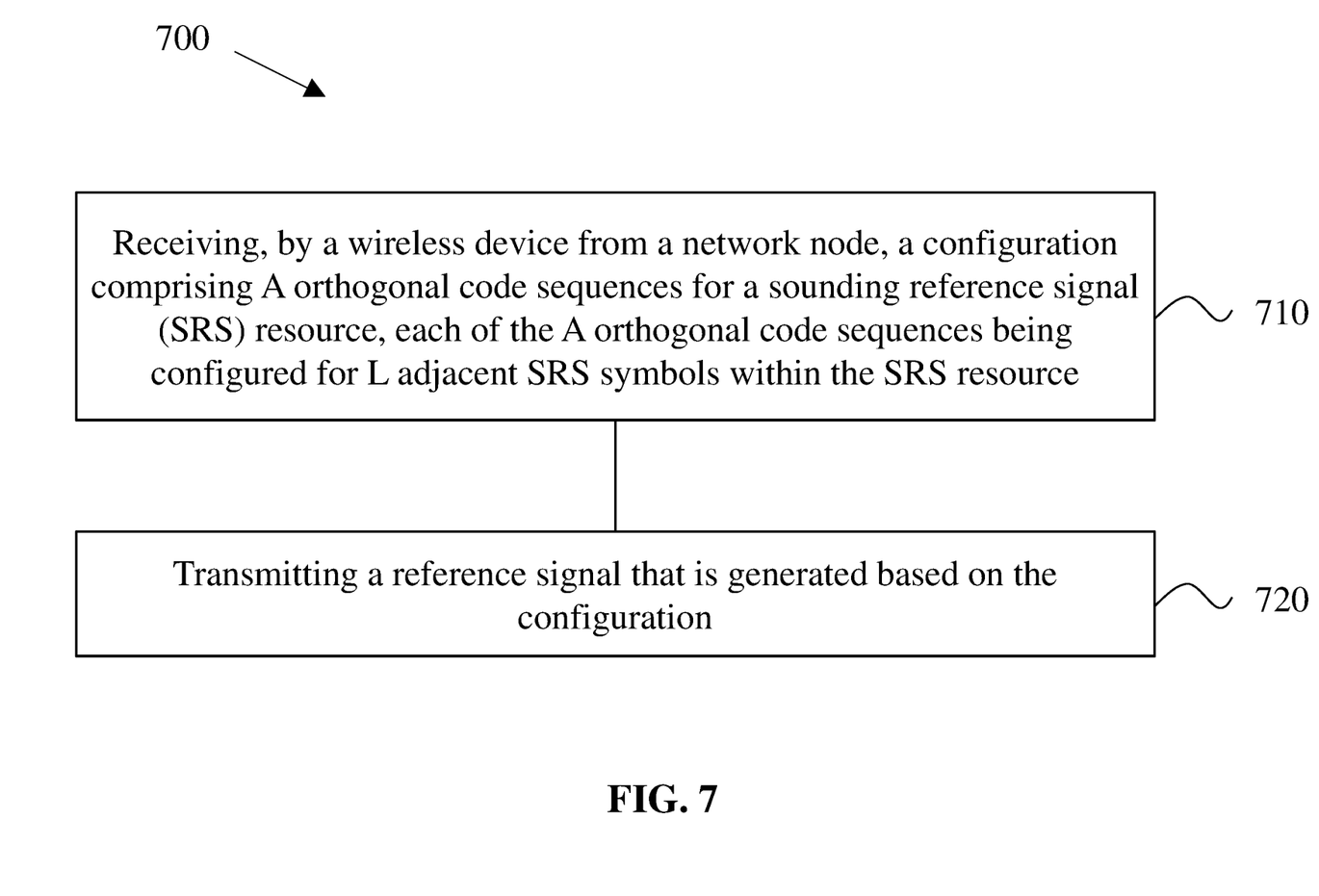
FIG. 7 shows another example of a wireless communication method, in accordance with some embodiments of the presently disclosed technology.

FIG. 7 shows an example of a method 700 for wireless communication. The method 700 includes, at operation 710, receiving, by a wireless device from a network node, a configuration comprising A orthogonal code sequences for a sounding reference signal (SRS) resource, each of the A orthogonal code sequences being configured for L adjacent SRS symbols within the SRS resource. In some embodiments, L is a length of each of the A orthogonal code sequences, and L and A are positive integers.

The method 700 includes, at operation 720, transmitting a reference signal that is generated based on the configuration.

In some embodiments, the A orthogonal code sequences for the SRS resource are configured by a high-level message comprising Radio Resource Control (RRC) signaling or Medium Access Control (MAC) Control Element (CE) signaling.

In some embodiments, A is equal to N/R, N/L or R/L, N is a number of SRS symbols in the SRS resource and R is a repetition factor, and R and N are positive integers.

In some embodiments, the A orthogonal code sequences applied to the SRS symbols are based on a time-varying pattern.

In some embodiments, the time-varying pattern is predetermined or configured using RRC signaling or MAC CE signaling.

In some embodiments, the configuration further comprises B indications of whether basic SRS sequences of L, R or N SRS symbols within the SRS resource are repeated, N is a number of SRS symbols in the SRS resource, R is a repetition factor, R, N and B are positive integers, and B≤A.

In some embodiments, the methods 600 and 700 further include the operations of determining that a plurality of physical uplink control channel (PUCCH) symbols are scheduled concurrently with a subset of the plurality of SRS symbols, and refraining, based on the orthogonal code sequences applied to the subset of the plurality of SRS symbols, from transmitting a portion of the plurality of SRS symbols.

In some embodiments, the portion of the plurality of SRS symbols is more than the subset of the plurality of SRS symbols.

In some embodiments, the orthogonal code sequence is [1 −1] or [1 1 −1 −1] or [1 −1 −1 1] or [1 −1 1 −1].

In some embodiments, the methods 600 and 700 further include the operations of

In some embodiments, determining that a plurality of physical uplink control channel (PUCCH) symbols are scheduled concurrently with a subset of the plurality of SRS symbols, and refraining, based on a Radio Resource Control (RRC) configuration, from transmitting a portion of the plurality of SRS symbols.

Figure 8:
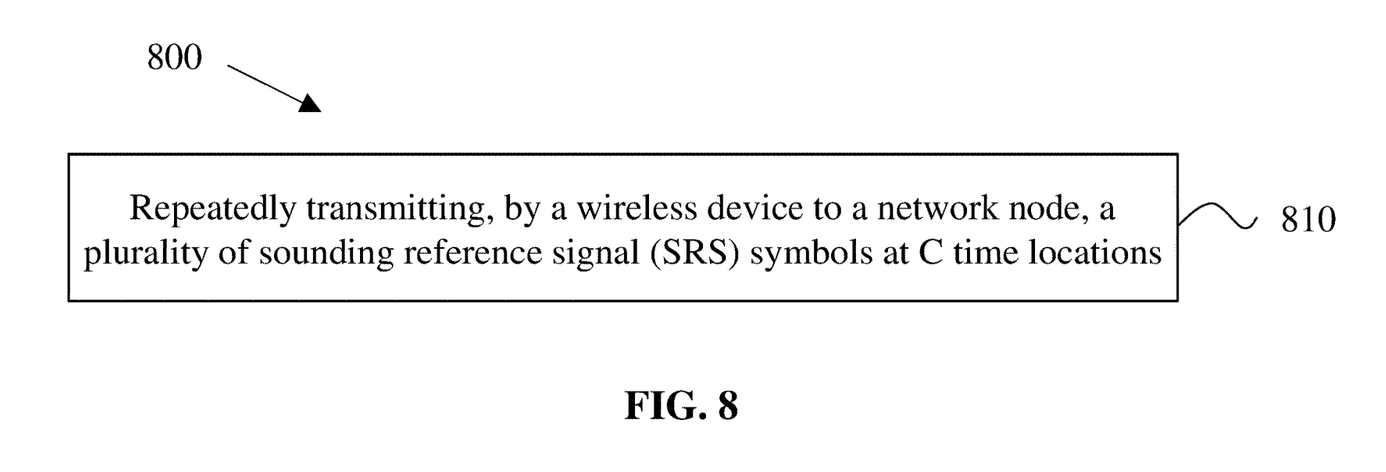
FIG. 8 shows yet another example of a wireless communication method, in accordance with some embodiments of the presently disclosed technology.

FIG. 8 shows an example of a method 800 for wireless communication. The method 800 includes, at operation 810, repeatedly transmitting, by a wireless device to a network node, a plurality of sounding reference signal (SRS) symbols at C time locations. In some embodiments, information associated with the C time locations is configured for each SRS resource, SRS resource set or SRS trigger state, and C is a positive integer.

Figure 9:
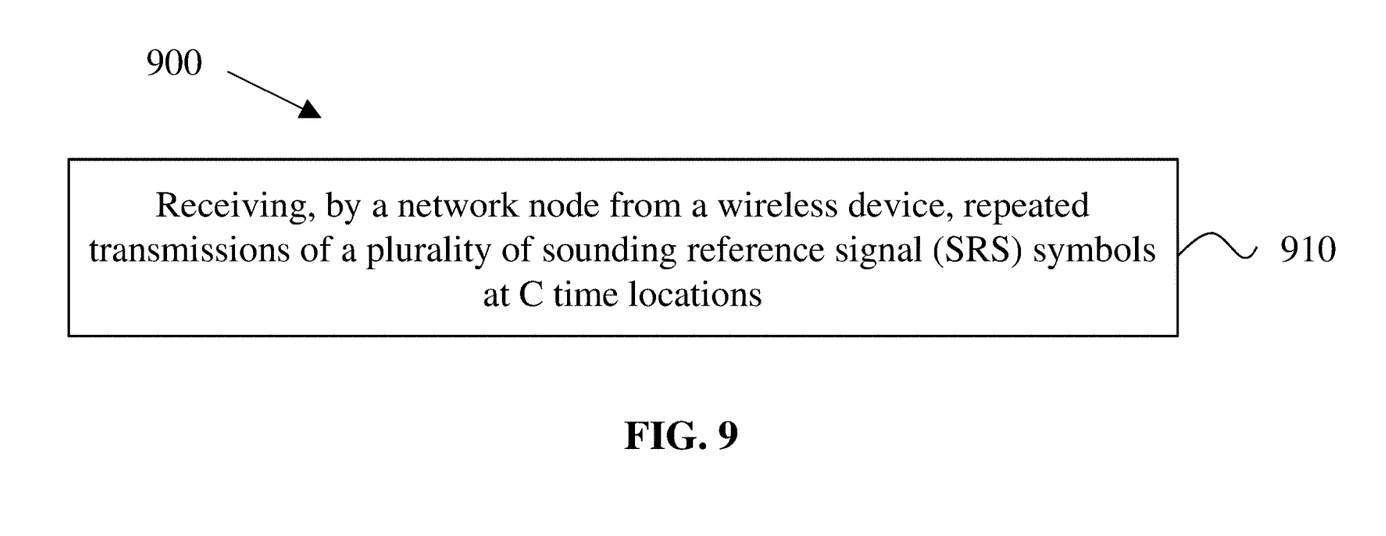
FIG. 9 shows yet another example of a wireless communication method, in accordance with some embodiments of the presently disclosed technology.

FIG. 9 shows an example of a method 900 for wireless communication. The method 900 includes, at operation 910, receiving, by a network node from a wireless device, repeated transmissions of a plurality of sounding reference signal (SRS) symbols at C time locations. In some embodiments, information associated with the C time locations is configured for each SRS resource, SRS resource set or SRS trigger state, and C is a positive integer.

In some embodiments, a value c of each of the C time offsets corresponds to a $c^{th}$ time slot or a $c^{th}$ available time slot after control signaling which triggers transmission of the plurality of SRS symbols.

In some embodiments, each of the C time offsets comprises a symbol offset or a slot offset.

In some embodiments, repeatedly transmitting is performed on C consecutive slots, consecutive uplink slots or consecutive available uplink slots, and C>1.

Embodiments of the disclosed technology include a wireless communications apparatus comprising a processor and a memory, wherein the processor is configured to read code from the memory and implement any one of methods 600, 700, 800 or 900.

Embodiments of the disclosed technology include a computer program product comprising a computer-readable program medium code stored thereupon, the code, when executed by a processor, causing the processor to implement any one of methods 600, 700, 800 or 900.

Figure 10:
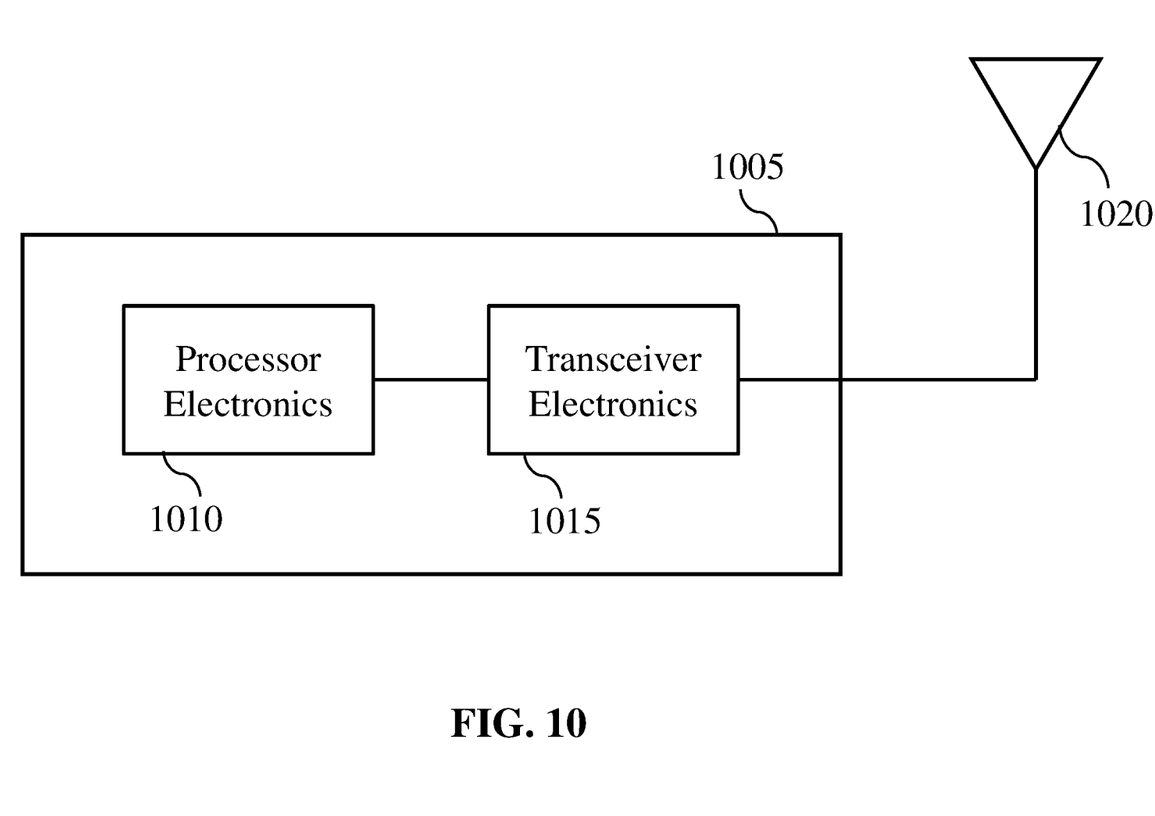
FIG. 10 is a block diagram representation of a portion of an apparatus that can be used to implement embodiments of the presently disclosed technology.

FIG. 10 is a block diagram representation of a portion of an apparatus, in accordance with some embodiments of the presently disclosed technology. An apparatus 1005, such as a base station or a wireless device (or UE), can include processor electronics 1010 such as a microprocessor that implements one or more of the techniques presented in this document. The apparatus 1005 can include transceiver electronics 1015 to send and/or receive wireless signals over one or more communication interfaces such as antenna(s) 1020. The apparatus 1005 can include other communication interfaces for transmitting and receiving data. Apparatus 1005 can include one or more memories (not explicitly shown) configured to store information such as data and/or instructions. In some implementations, the processor electronics 1010 can include at least a portion of the transceiver electronics 1015. In some embodiments, at least some of the disclosed techniques, modules or functions are implemented using the apparatus 1005.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
   transmitting, by a network node, a configuration comprising A orthogonal code sequences for a sounding reference signal (SRS) resource, wherein each of the A orthogonal code sequences is configured for L adjacent SRS symbols within the SRS resource, wherein L is a length of each of the A orthogonal code sequences, wherein L and A are positive integers,
   wherein the A orthogonal code sequences for the SRS resource are configured by a high-level message comprising Radio Resource Control (RRC) signaling or Medium Access Control (MAC) Control Element (CE) signaling, wherein A is equal to N/R, N/L or R/L, wherein N is a number of SRS symbols in the SRS resource and R is a repetition factor, wherein R and N are positive integers,
   wherein the configuration further comprises B indications of whether basic sequences of L, R or N SRS symbols within the SRS resource are repeated, wherein the basic sequences are sequences of the L, R or N SRS symbols before the A orthogonal code sequences are applied to the L, R or N SRS symbols, wherein B is a positive integer, wherein B≤A, and
   wherein the A orthogonal code sequences applied to the SRS symbols are based on a time-varying pattern, wherein the time-varying pattern is (1) predetermined or (2) configured using Radio Resource Control (RRC) signaling or Medium Access Control (MAC) Control Element (CE) signaling; and
   receiving, by the network node from a wireless device, a reference signal that is generated based on the configuration.

2. The method of claim 1, further comprising:
   determining that a plurality of physical uplink control channel (PUCCH) symbols are scheduled concurrently with a subset of a plurality of SRS symbols; and refraining, based on the orthogonal code sequences applied to the subset of the plurality of SRS symbols, from transmitting a portion of the plurality of SRS symbols.

3. The method of claim 1, further comprising:
determining that a plurality of physical uplink control channel (PUCCH) symbols are scheduled concurrently with a subset of a plurality of SRS symbols; and
refraining, based on a Radio Resource Control (RRC) configuration, from transmitting a portion of the plurality of SRS symbols.

4. A method of wireless communication, comprising:
receiving, by a wireless device from a network node, a configuration comprising A orthogonal code sequences for a sounding reference signal (SRS) resource, wherein each of the A orthogonal code sequences is configured for L adjacent SRS symbols within the SRS resource, wherein L is a length of each of the A orthogonal code sequences, wherein L and A are positive integers,
wherein the A orthogonal code sequences for the SRS resource are configured by a high-level message comprising Radio Resource Control (RRC) signaling or Medium Access Control (MAC) Control Element (CE) signaling, wherein A is equal to N/R, N/L or R/L, wherein N is a number of SRS symbols in the SRS resource and R is a repetition factor, and wherein R and N are positive integers;
wherein the configuration further comprises B indications of whether basic sequences of L, R or N SRS symbols within the SRS resource are repeated, wherein the basic sequences are sequences of the L, R or N SRS symbols before the A orthogonal code sequences are applied to the L, R or N SRS symbols, wherein B is a positive integer, wherein B≤A, and
wherein the A orthogonal code sequences applied to the SRS symbols are based on a time-varying pattern, wherein the time-varying pattern is (1) predetermined or (2) configured using Radio Resource Control (RRC) signaling or Medium Access Control (MAC) Control Element (CE) signaling; and
transmitting, by the wireless device to the network node, a reference signal that is generated based on the configuration.

5. The method of claim 4, wherein a plurality of physical uplink control channel (PUCCH) symbols are scheduled concurrently with a subset of a plurality of SRS symbols, the method further comprising:
receiving a modified subset of the plurality of SRS symbols, wherein the modified subset of the plurality of SRS symbols includes the subset of the plurality of SRS symbols with a portion of the plurality of SRS symbols removed, and wherein the portion of the plurality of SRS symbols is determined based on the orthogonal code sequences applied to the subset of the plurality of SRS symbols.

6. The method of claim 4, wherein a plurality of physical uplink control channel (PUCCH) symbols are scheduled concurrently with a subset of a plurality of SRS symbols, the method further comprising:
receiving a modified subset of the plurality of SRS symbols, wherein the modified subset of the plurality of SRS symbols includes the subset of the plurality of SRS symbols with a portion of the plurality of SRS symbols removed, and wherein the portion of the plurality of SRS symbols is determined based on a Radio Resource Control (RRC) configuration.

7. An apparatus for wireless communication comprising a processor and a memory storing instructions, execution of which by the processor causes the apparatus to:
transmit a configuration comprising A orthogonal code sequences for a sounding reference signal (SRS) resource, wherein each of the A orthogonal code sequences is configured for L adjacent SRS symbols within the SRS resource, wherein L is a length of each of the A orthogonal code sequences, wherein L and A are positive integers,
wherein the A orthogonal code sequences for the SRS resource are configured by a high-level message comprising Radio Resource Control (RRC) signaling or Medium Access Control (MAC) Control Element (CE) signaling, wherein A is equal to N/R, N/L or R/L, wherein N is a number of SRS symbols in the SRS resource and R is a repetition factor, and wherein R and N are positive integers;
wherein the configuration further comprises B indications of whether basic sequences of L, R or N SRS symbols within the SRS resource are repeated, wherein the basic sequences are sequences of the L, R or N SRS symbols before the A orthogonal code sequences are applied to the L, R or N SRS symbols, wherein B is a positive integer, wherein B≤A, and
wherein the A orthogonal code sequences applied to the SRS symbols are based on a time-varying pattern, wherein the time-varying pattern is (1) predetermined or (2) configured using Radio Resource Control (RRC) signaling or Medium Access Control (MAC) Control Element (CE) signaling; and
receive, from a wireless device, a reference signal that is generated based on the configuration.

8. The apparatus of claim 7, wherein the apparatus is further caused to:
determine that a plurality of physical uplink control channel (PUCCH) symbols are scheduled concurrently with a subset of a plurality of SRS symbols; and
refrain, based on the orthogonal code sequences applied to the subset of the plurality of SRS symbols, from transmitting a portion of the plurality of SRS symbols.

9. The apparatus of claim 7, wherein the apparatus is further caused to:
determine that a plurality of physical uplink control channel (PUCCH) symbols are scheduled concurrently with a subset of a plurality of SRS symbols; and
refrain, based on a Radio Resource Control (RRC) configuration, from transmitting a portion of the plurality of SRS symbols.

10. An apparatus for wireless communication comprising a processor and a memory storing instructions, execution of which by the processor causes the apparatus to:
receive, from a network node, a configuration comprising A orthogonal code sequences for a sounding reference signal (SRS) resource, wherein each of the A orthogonal code sequences is configured for L adjacent SRS symbols within the SRS resource, wherein L is a length of each of the A orthogonal code sequences, wherein L and A are positive integers,
wherein the A orthogonal code sequences for the SRS resource are configured by a high-level message comprising Radio Resource Control (RRC) signaling or Medium Access Control (MAC) Control Element (CE) signaling, wherein A is equal to N/R, N/L or R/L, wherein N is a number of SRS symbols in the SRS resource and R is a repetition factor, wherein R and N are positive integers, wherein the configuration further comprises B indications of whether basic sequences of L, R or N SRS symbols within the SRS resource are repeated, wherein the basic sequences are sequences of the L, R or N SRS symbols before the A orthogonal code sequences are applied to the L, R or N SRS symbols, wherein B is a positive integer, wherein B≤A, and wherein the A orthogonal code sequences applied to the SRS symbols are based on a time-varying pattern, wherein the time-varying pattern is (1) predetermined or (2) configured using Radio Resource Control (RRC) signaling or Medium Access Control (MAC) Control Element (CE) signaling; and transmit, to the network node, a reference signal that is generated based on the configuration.

11. The apparatus of claim 10, wherein a plurality of physical uplink control channel (PUCCH) symbols are scheduled concurrently with a subset of a plurality of SRS symbols, and wherein the apparatus is further caused to:

receive a modified subset of the plurality of SRS symbols, wherein the modified subset of the plurality of SRS symbols includes the subset of the plurality of SRS symbols with a portion of the plurality of SRS symbols removed, and wherein the portion of the plurality of SRS symbols is determined based on the orthogonal code sequences applied to the subset of the plurality of SRS symbols.

12. The apparatus of claim 10, wherein a plurality of physical uplink control channel (PUCCH) symbols are scheduled concurrently with a subset of a plurality of SRS symbols, and wherein the apparatus is further caused to:

receive a modified subset of the plurality of SRS symbols, wherein the modified subset of the plurality of SRS symbols includes the subset of the plurality of SRS symbols with a portion of the plurality of SRS symbols removed, and wherein the portion of the plurality of SRS symbols is determined based on a Radio Resource Control (RRC) configuration.

* * * * *